United States Patent
Benkreira et al.

(10) Patent No.: US 12,106,388 B2
(45) Date of Patent: *Oct. 1, 2024

(54) PAYING FOR PARKING WITH ELECTRICAL POWER FROM AN ELECTRIC VEHICLE

(71) Applicant: Capital One Services, LLC, McLean, VA (US)

(72) Inventors: Abdelkadar M'Hamed Benkreira, Washington, DC (US); Joshua Edwards, Philadelphia, PA (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 547 days.

This patent is subject to a terminal disclaimer.

(21) Appl. No.: 17/305,737

(22) Filed: Jul. 14, 2021

(65) Prior Publication Data
US 2021/0342959 A1    Nov. 4, 2021

Related U.S. Application Data

(63) Continuation of application No. 16/002,943, filed on Jun. 7, 2018, now Pat. No. 11,080,799.

(51) Int. Cl.
*G06Q 50/06*    (2024.01)
*G06Q 30/0283*    (2023.01)

(52) U.S. Cl.
CPC ......... *G06Q 50/06* (2013.01); *G06Q 30/0284* (2013.01); *G06Q 2240/00* (2013.01)

(58) Field of Classification Search
CPC . G06Q 50/06; G06Q 30/0284; G06Q 2240/00
(Continued)

(56) References Cited

U.S. PATENT DOCUMENTS

2009/0287578 A1    11/2009    Paluszek et al.
2010/0082464 A1*    4/2010    Keefe ............... G06Q 40/12
                                                        705/30

(Continued)

FOREIGN PATENT DOCUMENTS

AU    2011210669 A1 *    7/2012    ............... B60L 3/12
CN    108790889 A    *    11/2018
EP    2511122 A2        10/2012

OTHER PUBLICATIONS

T. Markel et al., Multi-Lab EV SmartGrid Integration Requirements Study: Providing Guidance on Technology Development and Demonstration, May 2015, Technical Report NREL/TP-5400-63963, 41 pages (Year: 2015).*

(Continued)

*Primary Examiner* — Shannon S Campbell
*Assistant Examiner* — Freda A Nelson
(74) *Attorney, Agent, or Firm* — Harrity & Harrity, LLP

(57) ABSTRACT

A device communicates with a parking meter associated with a parking space to be used for parking by an electric vehicle, where the electric vehicle is associated with the device. The device receives vehicle power information, vehicle profile information, and vehicle location information, and determines parking payment options based on the vehicle power information, the vehicle profile information, and the vehicle location information. The device receives a selection of a particular parking payment option of the parking payment options, where the particular parking payment option includes an option to pay for parking by providing power to the parking meter from the electric vehicle. The device causes the electric vehicle to connect to the parking meter based on the particular parking payment option, and causes the electric vehicle to provide power to
(Continued)

the parking meter based on the particular parking payment option.

20 Claims, 10 Drawing Sheets

(58) Field of Classification Search
USPC .................................................. 705/13, 400
See application file for complete search history.

(56) References Cited

U.S. PATENT DOCUMENTS

| | | | | |
|---|---|---|---|---|
| 2010/0274656 | A1* | 10/2010 | Genschel | B60L 53/80 |
| | | | | 705/14.27 |
| 2011/0202418 | A1* | 8/2011 | Kempton | B60L 53/68 |
| | | | | 705/26.1 |
| 2012/0229085 | A1 | 9/2012 | Lau et al. | |
| 2013/0179057 | A1* | 7/2013 | Fisher | B60L 53/66 |
| | | | | 701/1 |
| 2013/0179061 | A1* | 7/2013 | Gadh | B60L 53/305 |
| | | | | 701/1 |
| 2015/0183333 | A1 | 7/2015 | Forbes, Jr. et al. | |
| 2019/0152329 | A1* | 5/2019 | Onodera | B60L 53/665 |
| 2019/0378221 | A1 | 12/2019 | Benkreira et al. | |

OTHER PUBLICATIONS

He et al., "An Optimal Charging/Discharging Strategy for Smart Electrical CarParks", Jun. 2018, Chinese Journal of Electrical Engineering, vol. 4, No. 2, 8 pages (Year: 2018).*

Yao et al., "Optimal Charging and Discharging Scheduling for Electric Vehicles in a Parking Station with Photovoltaic System and EnergyStorageSystem, Apr. 17, 2017,Energies,SpecialIssueEnergy Management,Control,andSystemArchitecturesforElectricVehicleApplications", 21 pages. (Year: 2017).*

Rinaldi S., et al., "On the Integration of E-Vehicle Data for Advanced Management of Private Electrical Charging Systems," IEEE Instrumentation and Measurement Technology Conference, May 22-25, 2017, 6 pages.

* cited by examiner

PAYING FOR PARKING WITH ELECTRICAL POWER FROM AN ELECTRIC VEHICLE

RELATED APPLICATION

This application is a continuation of U.S. patent application Ser. No. 16/002,943, filed Jun. 7, 2018, which is incorporated herein by reference in its entirety.

BACKGROUND

Parking is the act of stopping and disengaging a vehicle and leaving it unoccupied. In some instances, parking a vehicle requires payment of a fee (e.g., to a parking meter) that depends upon a time period the vehicle is parked. Vehicle operators may pay for parking with coins, credit cards, and/or mobile applications tied to a transaction card and/or a transaction account.

SUMMARY

According to some implementations, a device may include one or more memories, and one or more processors configured to communicate with a parking meter associated with a parking space to be used for parking by an electric vehicle, where the electric vehicle is associated with the device. The one or more processors may receive vehicle power information, vehicle profile information, and vehicle location information, and may determine parking payment options based on the vehicle power information, the vehicle profile information, and the vehicle location information. The one or more processors may receive a selection of a particular parking payment option of the parking payment options, where the particular parking payment option includes an option to pay for parking by providing power to the parking meter from the electric vehicle. The one or more processors may cause the electric vehicle to connect to the parking meter based on the particular parking payment option, and may cause the electric vehicle to provide power to the parking meter based on the particular parking payment option.

According to some implementations, a non-transitory computer-readable medium may store instructions that include one or more instructions that, when executed by one or more processors of a device, cause the one or more processors to communicate with a parking meter associated with a parking space to be used for parking by an electric vehicle, where the electric vehicle is associated with the device. The one or more instructions may cause the one or more processors to receive, from the parking meter, price information indicating a price for power provided to the parking meter, and receive vehicle power information that includes information indicating a power level of a battery of the electric vehicle. The one or more instructions may cause the one or more processors to receive vehicle profile information that includes information indicating one or more destinations of the electric vehicle, and receive vehicle location information that includes information indicating a current location of the electric vehicle and a location of a nearest charging station. The one or more instructions may cause the one or more processors to determine parking payment options based on the price information, the vehicle power information, the vehicle profile information, and the vehicle location information, and receive a selection of a particular parking payment option of the parking payment options, where the particular parking payment option includes an option to pay for parking by providing power to the parking meter from the electric vehicle. The one or more instructions may cause the one or more processors to cause the electric vehicle to connect to the parking meter based on the particular parking payment option, and cause the electric vehicle to provide power to the parking meter after the electric vehicle connects to the parking meter and in accordance with the particular parking payment option.

According to some implementations, a method may include communicating, by a device, with a parking meter associated with a parking space to be used for parking by an electric vehicle, where the device is integrated within the electric vehicle. The method may include receiving, by the device, vehicle power information, vehicle profile information, and vehicle location information, and determining, by the device, parking payment options based on the vehicle power information, the vehicle profile information, and the vehicle location information. The method may include receiving, by the device, a selection of a particular parking payment option of the parking payment options, where the particular parking payment option includes an option to pay for parking by providing power to the parking meter from the electric vehicle. The method may include causing, by the device, the electric vehicle to connect to the parking meter based on the particular parking payment option, and causing, by the device, the electric vehicle to provide power to the parking meter based on the particular parking payment option and based on the electric vehicle connecting to the parking meter. The method may include providing, by the device, information associated with a power level of a battery of the electric vehicle as the electric vehicle provides power to the parking meter.

DETAILED DESCRIPTION

The following detailed description of example implementations refers to the accompanying drawings. The same reference numbers in different drawings may identify the same or similar elements.

Current methods of paying for parking may be cumbersome and impractical. For example, paying for parking with coins or money requires a vehicle operator to have sufficient money and/or specific types of coins to pay for the parking. Utilizing a credit card and/or a debit card to pay for parking requires the vehicle operator have a credit card and/or a debit card on hand to pay for the parking. Paying for parking with a mobile application requires the parking meter to support the mobile application and to receive payment via the mobile application.

Some implementations described herein provide a vehicle device that pays for parking with electrical power from an electric vehicle (e.g., any vehicle that includes a rechargeable power source or power generating element) associated with the vehicle device. For example, the vehicle device may communicate with a parking meter associated with a parking space to be used for parking the electric vehicle, and may receive vehicle power information, vehicle profile information, and vehicle location information. The vehicle device may determine parking payment options based on the vehicle power information, the vehicle profile information, and the vehicle location information, and may receive a selection of a particular parking payment option of the parking payment options. The particular parking payment option may include an option to pay for parking by providing power to the parking meter from a rechargeable power source or power generating element of the electric vehicle. The vehicle device may cause the electric vehicle to connect to the parking meter and provide power to the parking meter, based on the particular parking payment option.

Figure 1A:
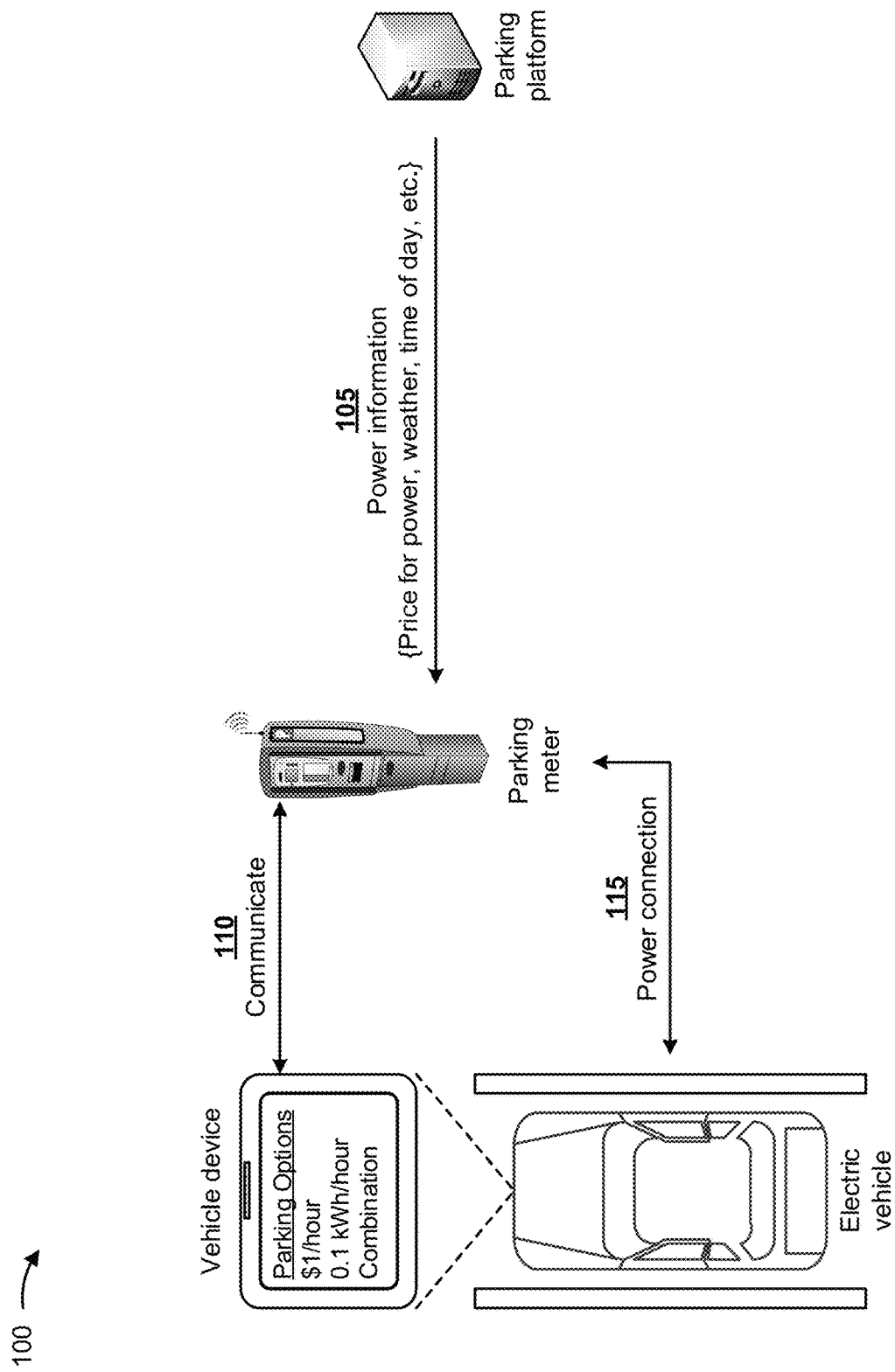
FIGS. 1A-1G are diagrams of an overview of an example implementation described herein.

FIGS. 1A-1G are diagrams of an overview of an example implementation 100 described herein. As shown in FIG. 1A, a vehicle device may be associated with an electric vehicle, a parking meter, and a parking platform. In some implementations, the vehicle device may be integrated within the electric vehicle (e.g., an infotainment system of the electric vehicle) and/or may be a mobile device (e.g., a smart phone) that is separate from the electric vehicle. In some implementations, the electric vehicle may include a battery that may be charged via a wireless connection and/or a wired connection, solar panels that provide power to the battery, and/or the like. As further shown, the electric vehicle may be parking at a parking space managed by the parking meter.

As further shown in FIG. 1A, and by reference number 105, the parking platform may provide power information to the parking meter, and the parking meter may receive the power information. In some implementations, the power information may include information indicating a current price being charged by utilities for electrical power, current weather in the area, a time of day, and/or the like. In such implementations, the parking meter may utilize the power information to determine a price that the parking meter will pay for electrical power received from an electric vehicle parked in the parking space.

For example, the parking meter may utilize dynamic, demand-driven pricing for electrical power similar to pricing charged by public utilities for electrical power. In such an example, the parking meter may pay peak prices for electrical power during particular times of a day (e.g., mornings, daytimes, and/or evenings during a week) and may pay lower prices during other times of a day (e.g., nights during the week, and during weekends). The parking meter may utilize additional power information to adjust a price that the parking meter will pay for electrical power, such as adjusting the price based on the weather (e.g., paying a lower price for electrical power if the electric vehicle is charged by solar panels and the weather is cloudy), adjusting the price based on a power source of the parking meter (e.g., paying a higher price for electrical power if the power source of the parking meter is compromised or running low), and/or the like. In some implementations, the parking meter may utilize the determined price that the parking meter will pay for electrical power to determine parking options for the parking space.

As further shown in FIG. 1A, and by reference number 110, when the electric vehicle enters the parking space, a beacon, a pressure sensor, an optical sensor, and/or the like, associated with the parking space and/or the parking meter, may recognize that the electric vehicle is in the parking space, and may cause the parking meter to connect and communicate with the vehicle device. As further shown, the parking meter may communicate information indicating parking options for the parking space, and the vehicle device may display (e.g., via a user interface) the information indicating the parking options to a user of the vehicle device. For example, the parking options may include payment options, such as $1.00 per hour (e.g., payable via money, a transaction card, a mobile application, and/or the like), 0.1 kilowatt hour per hour (kWh/hour) (e.g., payable via electrical power from the electric vehicle), a combination of payment in $1.00 per hour and kWh/h, and/or the like.

As further shown in FIG. 1A, and by reference number 115, a power connection may be established between the electric vehicle and the parking meter. In some implementations, the electric vehicle may connect to the parking meter via one of a wired connection or a wireless connection. A wired connection may require the user of the vehicle device to physically connect an electrical plug and/or an adapter, from the battery of the electric vehicle, to the power source of the parking meter. A wireless connection may include the battery of the electric vehicle wirelessly communicating with the power source of the parking meter. In some implementations, the power connection between the electric vehicle and the parking meter may not be established unless the user of the vehicle device decides to pay for the parking space with electrical power from the electric vehicle, as described elsewhere herein.

Figure 1B:
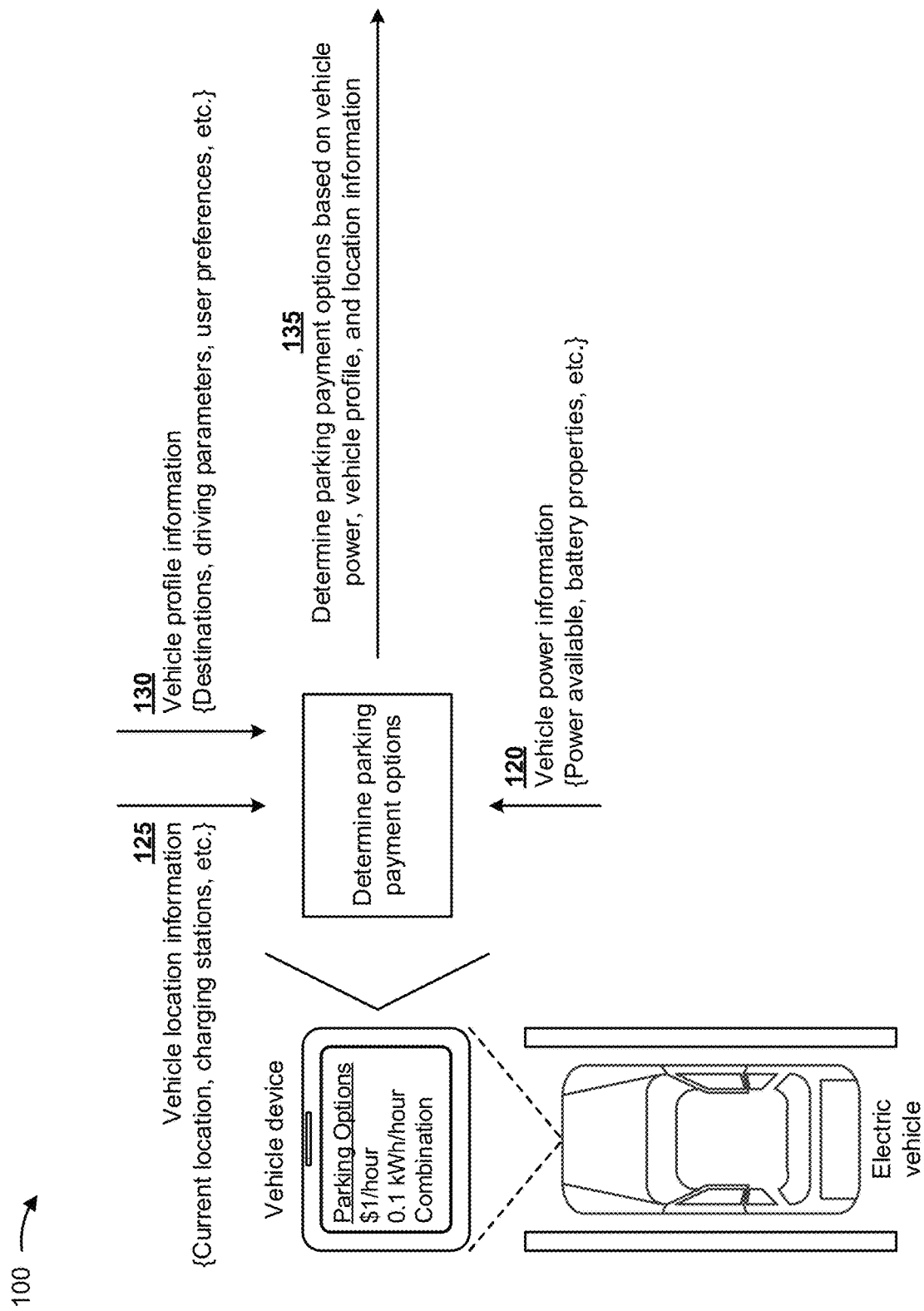

As shown in FIG. 1B, and by reference numbers 120, 125, and 130, the vehicle device may receive vehicle power information, vehicle location information, and vehicle profile information. In some implementations, the vehicle power information may include information identifying a quantity of power available for the battery of the electric vehicle, properties of the battery (e.g., a capacity of the battery, how quickly the battery loses power, a remaining distance the battery can cause the electric vehicle to travel, etc.), whether the electric vehicle includes solar panels generating electrical power, and/or the like. In some implementations, the vehicle location information may include information indicating a current location of the electric vehicle, distances between the current location and locations of nearest charging stations, current weather (e.g., which may affect generation of power by solar panels of the electric vehicle, if the electric vehicle includes solar panels), and/or the like. In some implementations, the vehicle profile information may include information indicating typical destinations of the electric vehicle (e.g., a home location, a work location, a gym location, and/or the like), driving habits of the user of the electric vehicle (e.g., the user drives quickly and drains the battery quickly, the user drives slowly and does not drain the battery quickly, and/or the like), preferences of the user of the electric vehicle (e.g., a user-defined threshold for outgoing power transfers from the electric vehicle, such as less than or equal to a particular amount (e.g., ten kWh), an amount that maintains a particular battery level (e.g., maintain battery level at 35%), etc.), and/or the like.

As further shown in FIG. 1B, and by reference number 135, the vehicle device may determine parking payment options for the electric vehicle based on the vehicle power information, the vehicle location information, and/or the vehicle profile information. In some implementations, the vehicle device may determine whether the electric vehicle can provide electrical power at the rate requested by the parking meter (e.g., the 0.1 kWh/hour provided in the parking options) based on the battery level of the electric vehicle; a distance to a nearest charging station; whether the electric vehicle will have enough electrical power to drive to a next destination, multiple destinations, the nearest charging stations, etc.; the user-defined threshold for outgoing power transfers; whether paying with money is cheaper than paying with electrical power; and/or the like.

In some implementations, the vehicle device may utilize one or more machine learning models to determine whether the electric vehicle can provide electrical power at the rate requested by the parking meter, such as a Gaussian process regression model, a linear regression model, a k-nearest neighbor model, a random forests model, a support vector machine model, and/or the like.

The Gaussian process regression model may include a machine learning model that employs a Gaussian process. The Gaussian process may include a stochastic process (e.g., a collection of random variables indexed by time or space) where every finite collection of random variables includes a multivariate normal distribution. The distribution of the Gaussian process may include a joint distribution of the random variables and, as such, may include a distribution over functions with a continuous domain (e.g., time or space). As a machine-learning model, the Gaussian process may use lazy learning and a measure of similarity between points (e.g., a kernel function) to predict a value for an unseen point from training data. The prediction may provide an estimate for the point, and may include uncertainty information (e.g., a one-dimensional Gaussian distribution, which is a marginal distribution at the point).

The linear regression model may include a machine learning model that employs a linear approach for modelling a relationship between a scalar dependent variable (y) and one or more explanatory variables (or independent variables) denoted (X). The linear regression model may focus on a conditional probability distribution of (y) given (X). In the linear regression model, the relationships are modeled using linear predictor functions (e.g., linear models) whose unknown model parameters are estimated from the data. In some implementations, the conditional mean of (y) given the value of (X) may be assumed to be an affine function of (X). Alternatively, a median or another quantile of the conditional probability distribution of (y) given (X) may be expressed as a linear function of (X).

The k-nearest neighbor model may include a machine learning model that employs a k-nearest neighbor method. The k-nearest neighbor method may include a non-parametric method that may be used for classification (e.g., where an output is a class membership) in which an object is classified by a majority vote of its neighbors, with the object being assigned to a class most common among its (k) nearest neighbors. The k-nearest neighbor method may be used for regression (e.g., where an output is a property value for an object) in which the property value is an average of property values of its (k) nearest neighbors. Additionally, weights may be assigned to the contributions of the neighbors, so that nearer neighbors contribute more to the average of the values than the more distant neighbors.

The random forests model may include an ensemble learning model for classification, regression, and other tasks. An ensemble learning model uses multiple learning models to gain better predictive results. The random forest model may create an entire forest of random uncorrelated decision trees to arrive at a best possible answer. In some implementations, the random forest model may operate by constructing a multitude of decision trees at training time and outputting a class that is a mode of classes (e.g., a classification) or a mean prediction (e.g., a regression) of the individual trees. The random forest model may correct for a decision tree overfitting to a training set (e.g., having a low bias, but a high variance) by providing a way to average multiple deep decision trees, trained on different parts of the same training set, with the goal of reducing the variance.

The support vector machine model may include a supervised learning model with one or more associated learning methods that analyze data used for classification and regression analysis. Given a set of training examples, each training example being marked as belonging to one or another of two categories, the support vector machine model builds a model that assigns new examples to one category or the other category. The support vector machine model is a representation of examples as points in space, mapped so that the examples of the separate categories are divided by a clear gap that is as wide as possible. New examples are then mapped into that same space and predicted to belong to a category based on which side of the gap they fall.

In this way, the vehicle device may utilize one or more machine learning models to determine whether the electric vehicle can provide electrical power at the rate requested by the parking meter. In some implementations, the vehicle device may select which one or more of the machine learning models to utilize based on the vehicle power information, the vehicle location information, the vehicle profile information, and/or the like. In some implementations, the vehicle device may utilize multiple machine learning models, may weight results of the multiple machine learning models, and may combine the results to obtain a final result (e.g., a determination of whether the electric vehicle can provide electrical power at the rate requested by the parking meter).

Figure 1C:
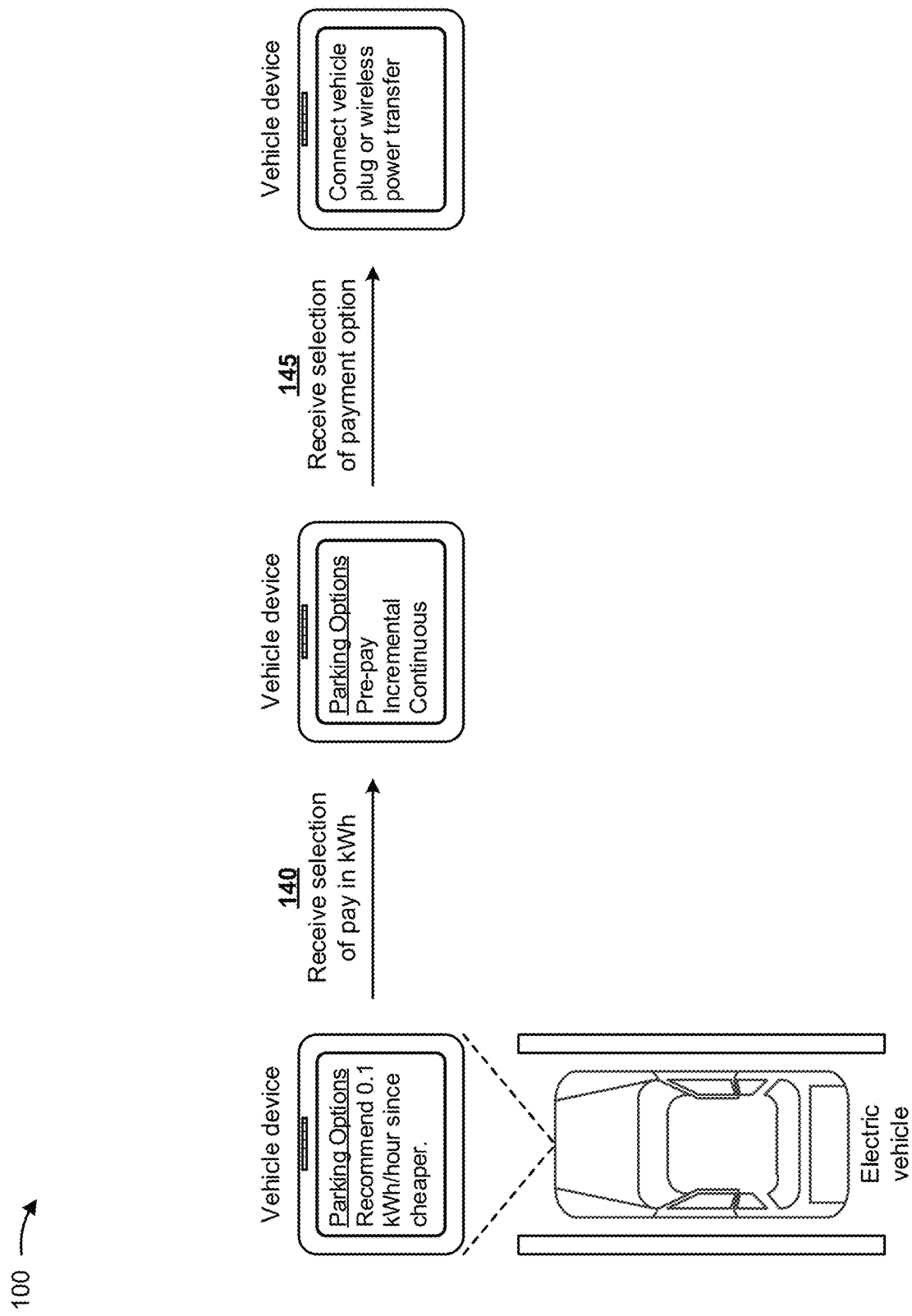

As shown in FIG. 1C, the vehicle device may provide for display the determined parking payment options via a user interface. For example, the user interface may indicate that the vehicle device recommends paying for parking with electrical power, rather than money, because paying for parking with electrical power (e.g., at 0.1 kWh/hour) is cheaper than paying with money (e.g., $1.00/hour), the electric vehicle battery includes enough power to get to a next destination of the electric vehicle, 0.1 kWh is worth less than $1.00 because the electric vehicle may be charged using home solar panels for nearly free or because the user pre-paid for electrical power at a fixed-rate (e.g., $7.90 per kWh), and/or the like. In such an example, the user may utilize the user interface to select an option to pay for parking with electrical power from the electric vehicle.

As further shown in FIG. 1C, and by reference number 140, when the user selects the option to pay for parking with electrical power, the vehicle device may provide for display a user interface that includes further parking payment options. For example, the user interface may include a parking payment option of pre-paying for parking for a particular time period (e.g., a one-time electrical power transfer to the parking meter), a parking payment option of incrementally paying for parking (e.g., an electrical power transfer to the parking meter at particular time increments), a parking payment option of continuously paying for parking (e.g., a continuous low electrical power transfer to the parking meter), and/or the like. In such an example, the user may utilize the user interface to select the parking payment option that includes pre-paying for parking for a particular time period (e.g., four hours).

As further shown in FIG. 1C, and by reference number 145, when the user selects the parking payment option that includes pre-paying for parking, the vehicle device may provide for display a user interface that includes parking instructions. For example, the user interface may instruct the user of the vehicle device to connect the plug and/or the adaptor of the electric vehicle to the parking meter or cause the electric vehicle to wirelessly connect to the parking meter. If the electric vehicle includes a plug and/or an adaptor and the user has not already connected the electric vehicle to the parking meter, the user may connect the plug and/or the adaptor of the electric vehicle to the parking meter. If the electric vehicle includes a wireless adaptor, the vehicle device may cause the electric vehicle to wirelessly connect to the parking meter (e.g., via a transmitter coil of the electric vehicle and a receiver coil below the electric vehicle at a parking space).

Figure 1D:
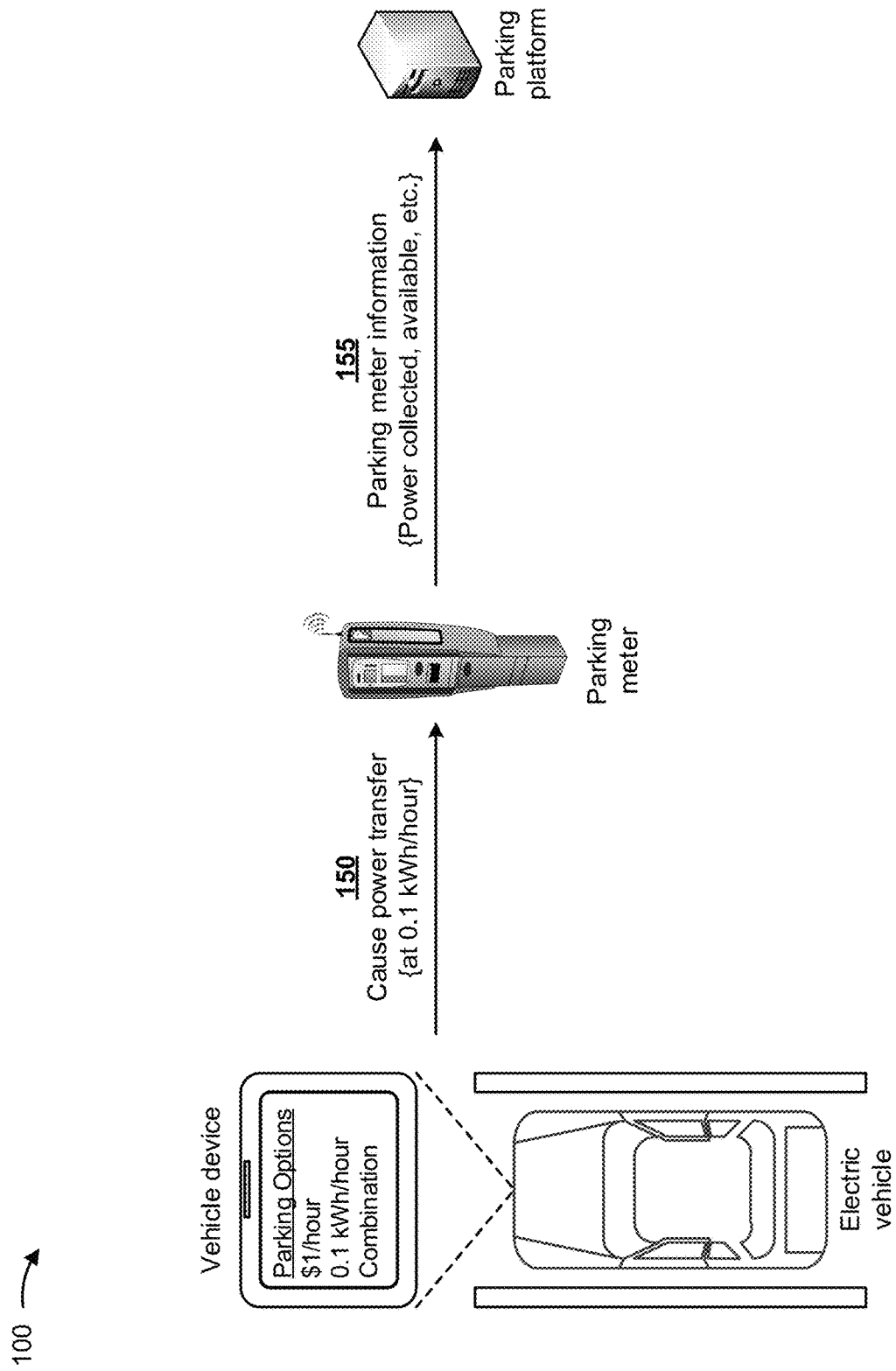

As shown in FIG. 1D, and by reference number 150, after the electric vehicle (e.g., the battery of the electric vehicle) and the parking meter (e.g., the power source of the parking meter) are connected, the vehicle device may cause the battery of the electric vehicle to transfer electrical power to the power source of the parking meter (e.g., at a rate of 0.1 kWh per hour). For example, the battery may include a transmitter coil that transmits the electrical power to a receiver coil below the electric vehicle at a parking space or to a receiver coil of the power source of the parking meter. The power source of the parking meter may receive the electrical power, and the parking meter may determine information associated with the power source, receive the electrical power, and/or the like.

As further shown in FIG. 1D, and by reference number 155, the parking meter may provide parking meter information to the parking platform. In some implementations, the parking meter information may include information identifying a quantity of electrical power collected from the electric vehicle, a current power level of the power source of the parking meter, and/or a quantity of available electrical power (e.g., extra electrical power if the power source is adequately charged) that the parking meter can provide to other consumers of electrical power, as described elsewhere herein.

Figure 1E:
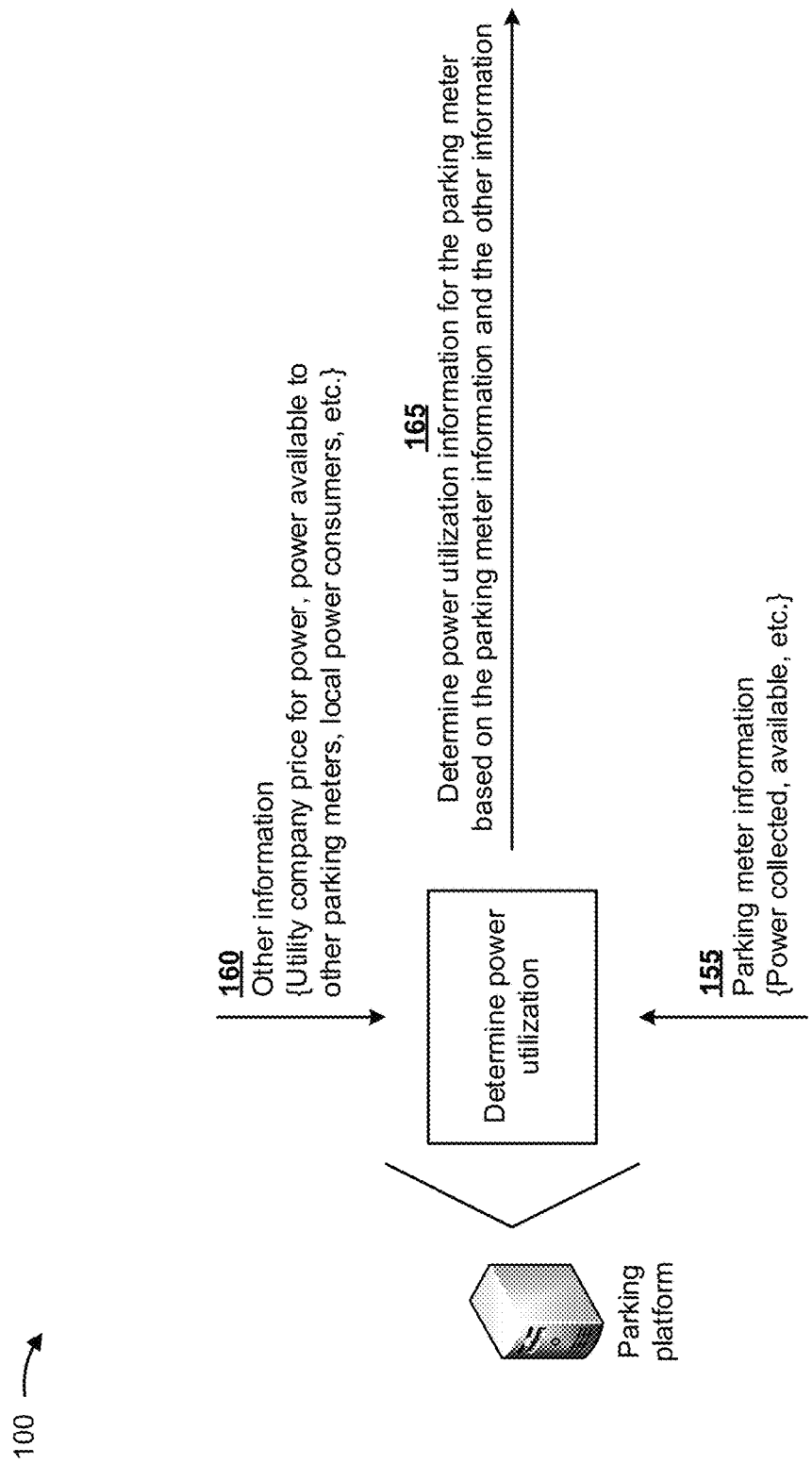

As shown in FIG. 1E, and by reference numbers 155 and 160, the parking platform may receive the parking meter information from the parking meter, and may receive other information from other consumers of electrical power. In some implementations, the other information may include information indicating a price that a utility company is willing to pay for electrical power, electrical power available to other parking meters associated with the parking meter, electrical power available to local electrical power consumers (e.g., local businesses, local charging stations, and/or the like), and/or the like.

As further shown in FIG. 1E, and by reference number 165, the parking platform may determine power utilization information for the parking meter based on the parking meter information and the other information. In some implementations, the power utilization information may include information indicating that the parking meter should provide the available electrical power to the utility company, the other parking meters, the local businesses, etc., prices to charge for the available electrical power, and/or the like.

Figure 1F:
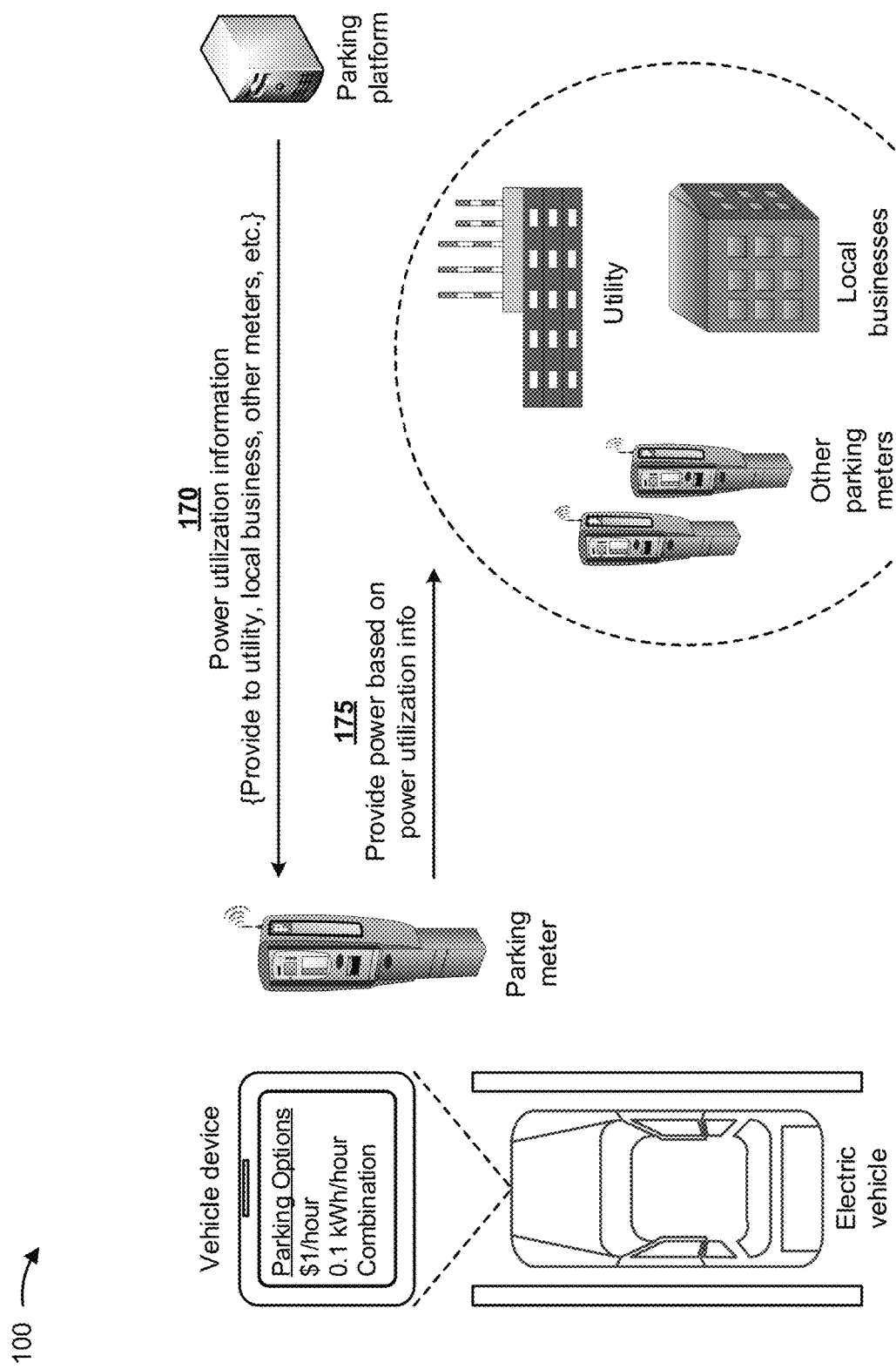

As shown in FIG. 1F, and by reference number 170, the parking platform may provide the power utilization information to the parking meter, and the parking meter may receive the power utilization information. In some implementations, the power utilization information may cause the parking meter to perform one or more actions. For example, as further shown in FIG. 1F, and by reference number 175, the power utilization information may cause the parking meter to provide the available electrical power to the utility company, the other parking meters, and the local businesses at the prices provided by the power utilization information. In some implementations, the parking meter may charge different prices for the electrical power provided to the utility company, the other parking meters, and/or the local businesses (e.g., the parking meter may not charge a price for electrical power provided to the other parking meters). In some implementations, the parking meter and the parking platform may continuously monitor the parking meter information, and may update the power utilization information based on monitoring the parking meter information.

Figure 1G:
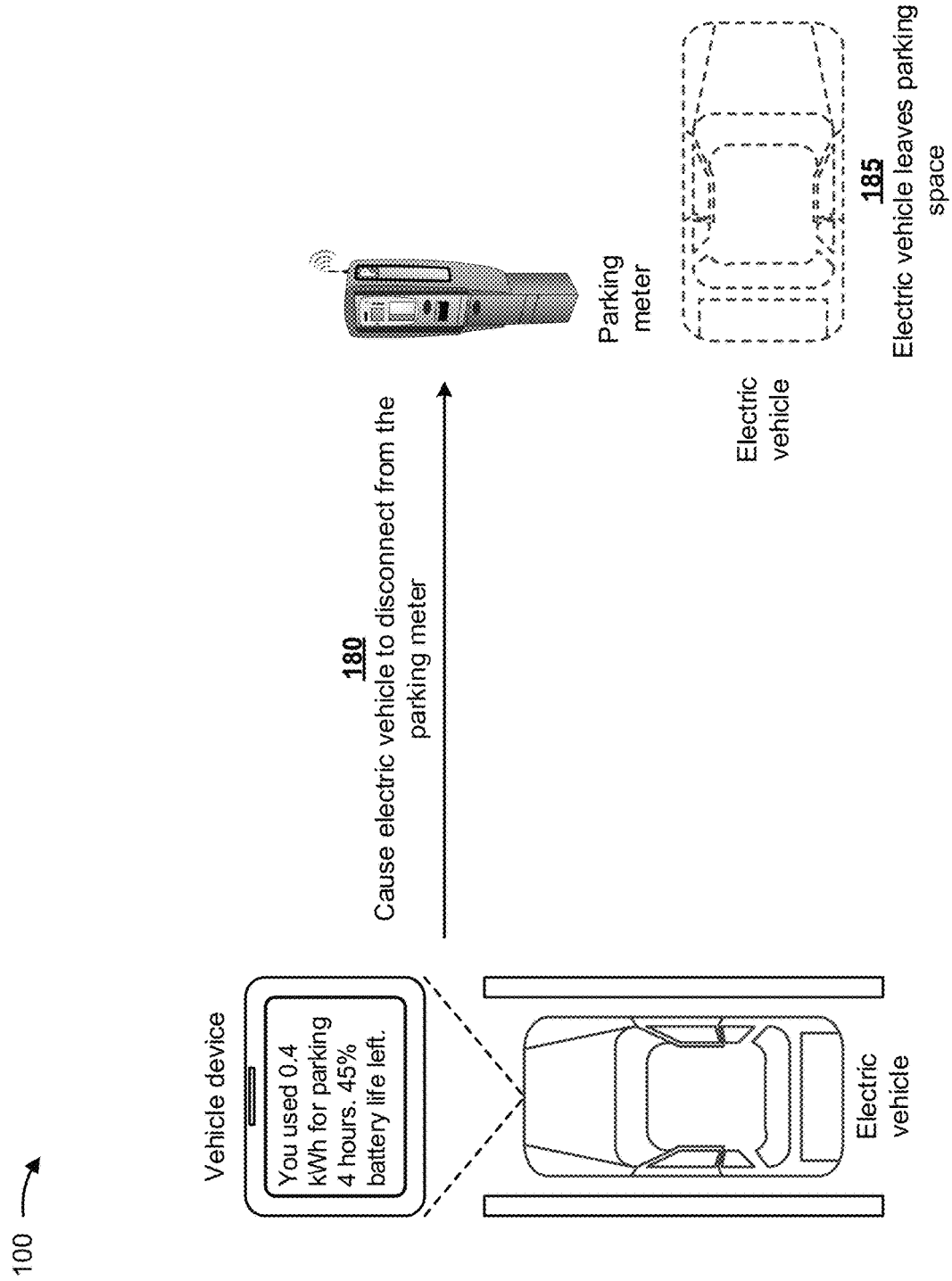

As shown in FIG. 1G, assume that the time period has expired and the electric vehicle is going to leave the parking space. As further shown in FIG. 1G, and by reference number 180, the vehicle device may cause the electric vehicle to disconnect from the parking meter, or the user of the vehicle device may physically disconnect the electrical plug and/or the adapter from the parking meter so that the electric vehicle may leave the parking space. In some implementations, the vehicle device may provide for display a user interface that provides information associated with the battery of the electric vehicle (e.g., after providing the electrical power to the parking meter), such as a current capacity of the battery, a quantity of electrical power provided to the parking meter from the battery, and/or the like. For example, as shown in FIG. 1G, the user interface may indicate that the electric vehicle provided 0.4 kWh to the parking meter for four hours of parking, and that the battery has 45% of battery life remaining. As further shown in FIG. 1G, and by reference number 185, after the electric vehicle is disconnected from the parking meter, the electric vehicle may leave the parking space and drive away.

In this way, the vehicle device may enable the electric vehicle to pay for parking with electrical power when the user cannot pay with money, the electric vehicle receives free electrical power (e.g., at home or at work), and/or the like. In some implementations, the payment for parking with electrical power may eliminate a need for solar panels at parking meters, may eliminates a need for money management of parking meters (e.g., collecting coins from parking meters), may eliminate theft of money from parking meters, and/or the like. In some implementations, the vehicle device may be associated with a mobile parking application (e.g., provided on a mobile device of the user), and the mobile parking application may provide alerts to the user when the battery level of the electric vehicle is approaching a threshold. In such implementations, the mobile parking application may instruct the vehicle device to switch to monetary payment for the parking space.

In this way, several different stages of the process for paying for parking are automated, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique to pay for parking with electrical power from an electric vehicle. Finally, automating the process for paying for parking conserves computing resources (e.g., processing resources, memory resources, and/or the like) that would otherwise be wasted in attempting to pay for parking.

As indicated above, FIGS. 1A-1G are provided merely as examples. Other examples are possible and may differ from what was described with regard to FIGS. 1A-1G.

Figure 2:
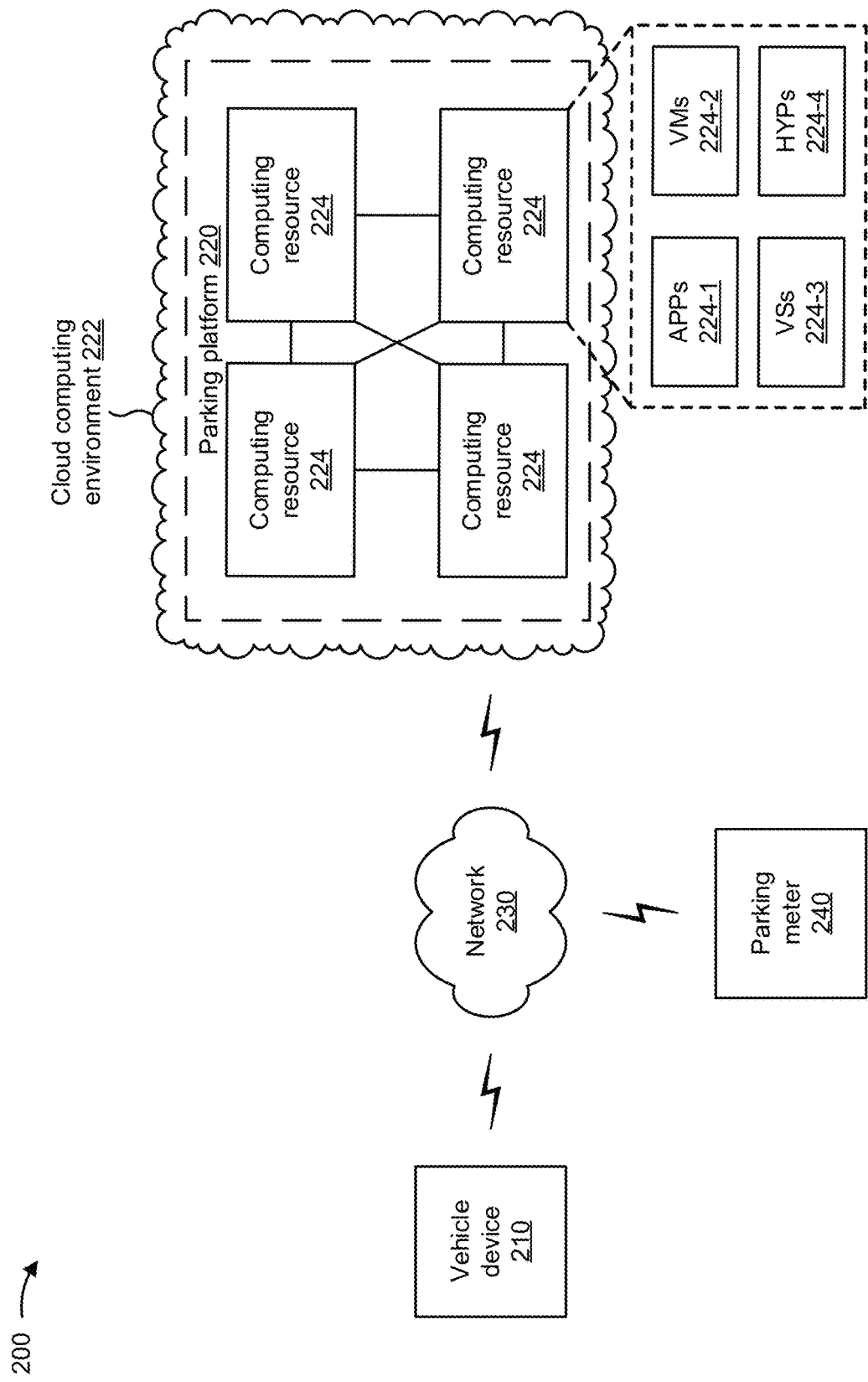
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a vehicle device 210, a parking platform 220, a network 230, and a parking meter 240. Devices of environment 200 may interconnect via wired connections, wireless connections, or a combination of wired and wireless connections.

Vehicle device 210 includes one or more devices capable of receiving, generating, storing, processing, and/or providing information, such as information described herein. In some implementations, vehicle device 210 may include a device integrated within an electric vehicle, such as an in-vehicle infotainment (IVI) system, an in-car entertainment (ICE) system, a telematics device, a Global Positioning System (GPS) device, or a similar type of device. In some implementations, vehicle device 210 may include a device that is separate from but associated with an electric vehicle, such as a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, vehicle device 210 may receive information from and/or transmit information to parking platform 220 and/or parking meter 240.

Parking platform 220 includes one or more devices that manage multiple parking meters, such as parking meter 240. In some implementations, parking platform 220 may be designed to be modular such that certain software components may be swapped in or out depending on a particular need. As such, parking platform 220 may be easily and/or quickly reconfigured for different uses. In some implementations, parking platform 220 may receive information from and/or transmit information to one or more vehicle devices 210 and/or parking meters 240.

In some implementations, as shown, parking platform 220 may be hosted in a cloud computing environment 222. Notably, while implementations described herein describe parking platform 220 as being hosted in cloud computing environment 222, in some implementations, parking platform 220 may not be cloud-based (i.e., may be implemented outside of a cloud computing environment) or may be partially cloud-based.

Cloud computing environment 222 includes an environment that hosts parking platform 220. Cloud computing environment 222 may provide computation, software, data access, storage, etc. services that do not require end-user knowledge of a physical location and configuration of system(s) and/or device(s) that hosts parking platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host parking platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by vehicle device 210 and/or parking meter 240. Application 224-1 may eliminate a need to install and execute the software applications on vehicle device 210 and/or parking meter 240. For example, application 224-1 may include software associated with parking platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of vehicle device 210 or an operator of parking platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Parking meter 240 includes an electrical device that collects money in exchange for a right to park a vehicle in a particular place for a limited amount of time. In some implementations, parking meter 240 may be used by municipalities to enforce integrated on-street parking policies, collect revenue, and/or the like. In some implementations, parking meter 240 may include an interface to receive wireless communication signals, an interface to receive electrical power, an interface to transmit electrical power, and/or the like. In some implementations, parking meter 240 may be associated with and charge for a single parking space, may be associated with and charge for multiple parking spaces, and/or the like. In some implementations, parking meter 240 may receive information from and/or transmit information to vehicle device 210 and/or parking platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
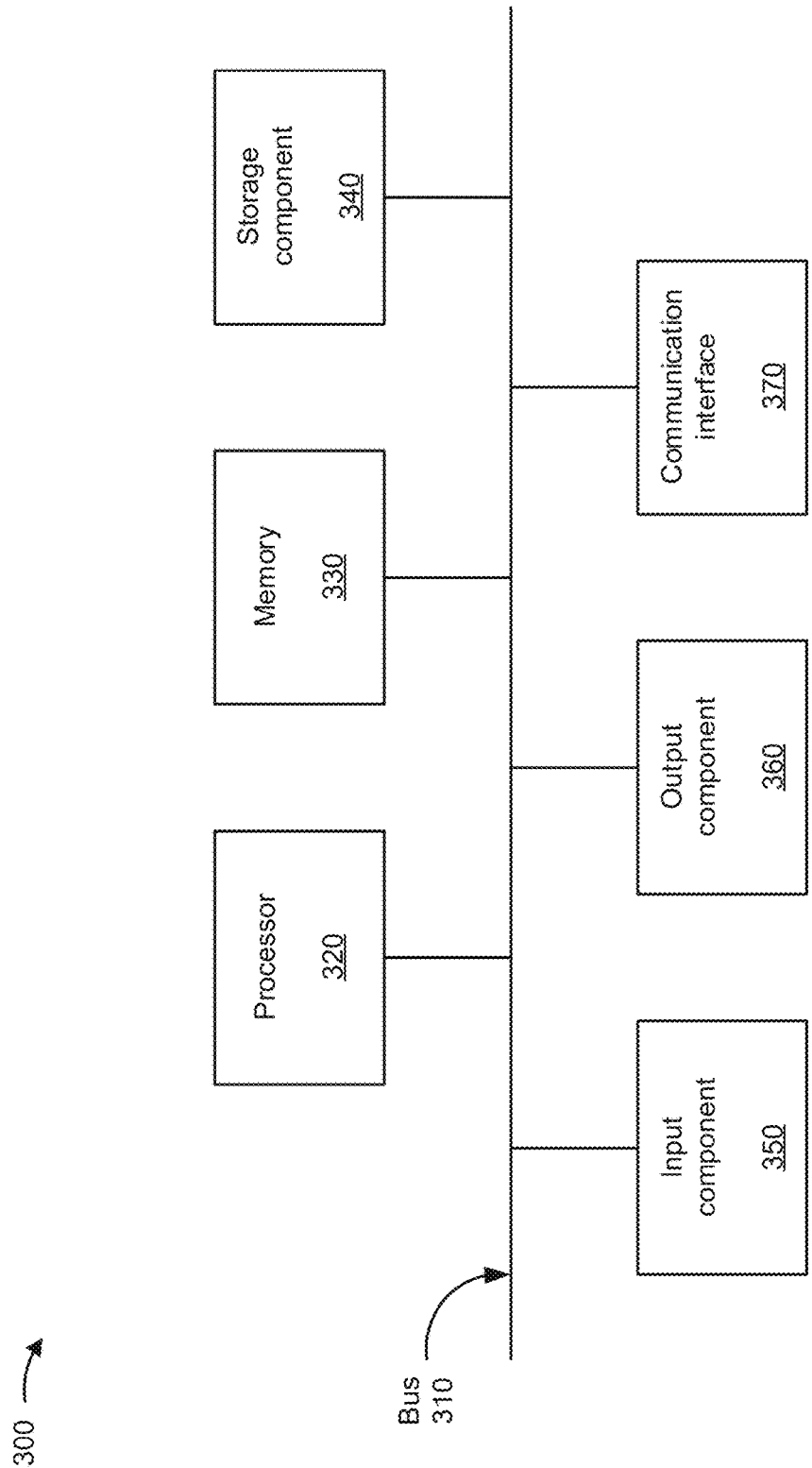
FIG. 3 is a diagram of example components of one or more devices of FIG. 2.

FIG. 3 is a diagram of example components of a device 300. Device 300 may correspond to vehicle device 210, parking platform 220, computing resource 224, and/or parking meter 240. In some implementations, vehicle device 210, parking platform 220, computing resource 224, and/or parking meter 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
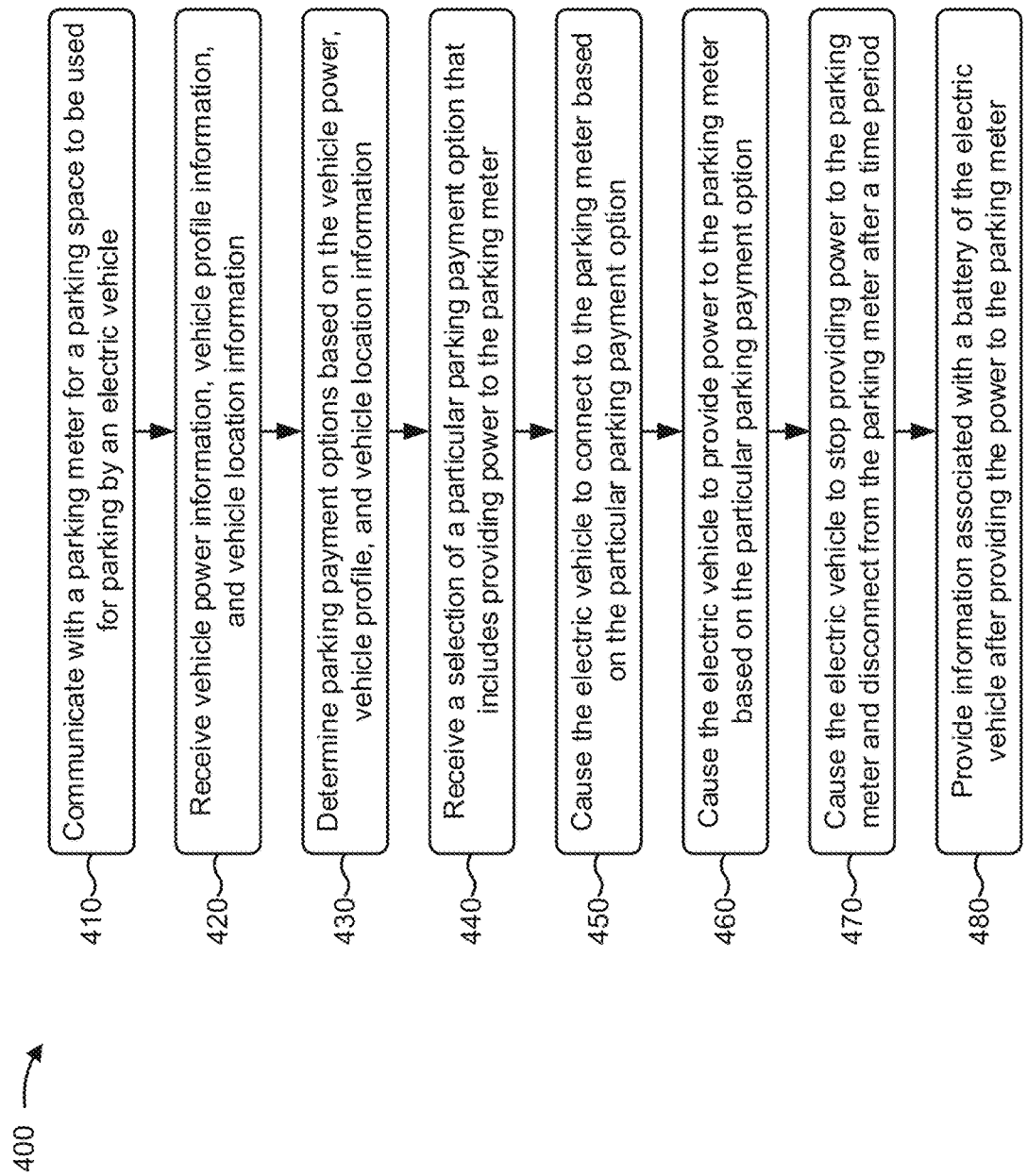
FIG. 4 is a flow chart of an example process for paying for parking with electrical power from an electric vehicle.

FIG. 4 is a flow chart of an example process 400 for paying for parking with electrical power from an electric vehicle. In some implementations, one or more process blocks of FIG. 4 may be performed by a vehicle device (e.g., vehicle device 210). In some implementations, one or more process blocks of FIG. 4 may be performed by another device or a group of devices separate from or including vehicle device 210, such as parking platform 220 and/or parking meter 240.

As shown in FIG. 4, process 400 may include communicating with a parking meter for a parking space to be used for parking by an electric vehicle (block 410). For example, the vehicle device (e.g., using processor 320, communication interface 370, and/or the like) may communicate with a parking meter for a parking space to be used for parking by an electric vehicle, as described above in connection with FIGS. 1A-2.

As further shown in FIG. 4, process 400 may include receiving vehicle power information, vehicle profile information, and vehicle location information (block 420). For example, the vehicle device (e.g., using processor 320, storage component 340, communication interface 370, and/or the like) may receive vehicle power information, vehicle profile information, and vehicle location information, as described above in connection with FIGS. 1A-2.

As further shown in FIG. 4, process 400 may include determining parking payment options based on the vehicle power information, the vehicle profile information, and the vehicle location information (block 430). For example, the vehicle device (e.g., using processor 320, storage component 340, and/or the like) may determine parking payment options based on the vehicle power information, the vehicle profile information, and the vehicle location information, as described above in connection with FIGS. 1A-2.

As further shown in FIG. 4, process 400 may include receiving a selection of a particular parking payment option that includes providing power to the parking meter (block 440). For example, the vehicle device (e.g., using processor 320, communication interface 370, and/or the like) may receive a selection of a particular parking payment option that includes providing power to the parking meter, as described above in connection with FIGS. 1A-2.

As further shown in FIG. 4, process 400 may include causing the electric vehicle to connect to the parking meter based on the particular parking payment option (block 450). For example, the vehicle device (e.g., using processor 320, memory 330, and/or the like) may cause the electric vehicle to connect to the parking meter based on the particular parking payment option, as described above in connection with FIGS. 1A-2.

As further shown in FIG. 4, process 400 may include causing the electric vehicle to provide power to the parking meter based on the particular parking payment option (block 460). For example, the vehicle device (e.g., using processor 320, memory 330, and/or the like) may cause the electric vehicle to provide power to the parking meter based on the particular parking payment option, as described above in connection with FIGS. 1A-2.

As further shown in FIG. 4, process 400 may include causing the electric vehicle to stop providing power to the parking meter and disconnect from the parking meter after a time period (block 470). For example, the vehicle device (e.g., using processor 320, storage component 340, and/or the like) may cause the electric vehicle to stop providing power to the parking meter and disconnect from the parking meter after a time period, as described above in connection with FIGS. 1A-2.

As further shown in FIG. 4, process 400 may include providing information associated with a battery of the electric vehicle after providing the power to the parking meter (block 480). For example, the vehicle device (e.g., using processor 320, storage component 340, communication interface 370, and/or the like) may provide information associated with a battery of the electric vehicle after providing the power to the parking meter, as described above in connection with FIGS. 1A-2.

Process 400 may include additional implementations, such as any single implementation or any combination of implementations described below and/or described with regard to any other process described herein.

In some implementations, the vehicle device may cause the electric vehicle to stop providing power to the parking meter and to disconnect from the parking meter after a time period, and may provide information associated with a battery of the electric vehicle after the electric vehicle is disconnected from the parking meter. In some implementations, the vehicle device may include a mobile device associated with the electric vehicle, or an integrated device integrated with the electric vehicle. In some implementations, the vehicle power information may include information indicating a power level associated with a battery of the electric vehicle, the vehicle profile information may include information indicating a first distance to a destination of the electric vehicle, the vehicle location information may include information indicating a second distance to a charging station, and the vehicle device may determine the parking payment options based on the power level associated with the battery, the first distance, and the second distance.

In some implementations, the vehicle profile information may include information indicating a threshold power level for a battery of the electric vehicle, and the vehicle device may determine the parking payment options based on the threshold power level for the battery of the electric vehicle. In some implementations, the parking payment options may include an option to pay for parking with power from the electric vehicle, an option to pay for parking with a transaction card, an option to pay for parking with power from the electric vehicle and with money, an option to prepay for parking for a predetermined quantity of time, an option to incrementally pay for parking over predetermined time increments, and/or an option to continuously pay for parking over time. In some implementations, the vehicle device may provide the parking payment options for display via a user interface, and may receive the selection of the particular parking payment option, of the parking payment options, via the user interface.

In some implementations, the vehicle device may receive an alert indicating that the power level of the battery is below a predetermined threshold, may cause the electric vehicle to stop providing power to the parking meter and to disconnect from the parking meter based on the alert, and may provide payment for the parking via a transaction card. In some implementations, the vehicle device may cause the electric vehicle to stop providing power to the parking meter and to disconnect from the parking meter when the electric vehicle is to leave the parking space, and may provide information associated with the battery of the electric vehicle after causing the electric vehicle to stop providing power to the parking meter. In some implementations, the electric vehicle may connect to the parking meter via a wired connection, or a wireless connection.

In some implementations, the vehicle profile information may include information indicating locations of charging stations used by the electric vehicle and information indicating daily travel distances by the electric vehicle, and the vehicle device may determine the parking payment options based on the information indicating the locations of the charging stations used by the electric vehicle and the information indicating the daily travel distances by the electric vehicle. In some implementations, the vehicle profile information may include information indicating how much is paid to charge the electric vehicle, and the vehicle device may determine the parking payment options based on the information indicating how much is paid to charge the electric vehicle. In some implementations, the price for power provided to the parking meter depends on information indicating a current time of day, a current day of a week, historical peak power usage, current weather, a current power level of the parking meter, a current price charged by a public utility for power, and/or an operational state of a charging component of the parking meter.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide a vehicle device that pays for parking with electrical power from an electric vehicle associated with the vehicle device. For example, the vehicle device may communicate with a parking meter associated with a parking space to be used for parking the electric vehicle, and may receive vehicle power information, vehicle profile information, and vehicle location information. The vehicle device may determine parking payment options based on the vehicle power information, the vehicle profile information, and the vehicle location information, and may receive a selection of a particular parking payment option of the parking payment options. The particular parking payment option may include an option to pay for parking by providing power to the parking meter from the electric vehicle. The vehicle device may cause the electric vehicle to connect to the parking meter and provide power to the parking meter, based on the particular parking payment option.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    establishing, by a first device, communication with a second device associated with parking services;
    determining, by the first device, one or more payment options based on receiving information including at least one of:
    power information,
    profile information, or
    location information;
    determining, by the first device, that an option to pay for services provided by the second device by providing power to the second device is less expensive than payment by money,
    wherein the services provided by the second device are associated with the parking services, and
    wherein the option is of the one or more payment options;
    recommending, by the first device and based on determining that the option to pay for services provided by the second device by providing power to the second device is less expensive than payment by money, the option;
    displaying, by the first device, information indicating that the first device recommends the option;
    causing, by the first device, based on displaying the information, and based on a particular payment option of the one or more payment options being selected, a power connection to be established between the first device and the second device; and
    causing, by the first device, based on the particular payment option being selected, and based on the power connection, one or more components associated with the first device to provide power to the second device.

2. The method of claim 1, wherein the second device is associated with a power network that includes at least one of:
    a utility company,
    a local business, or
    a parking location.

3. The method of claim 1, wherein the first device is integrated within a vehicle; and
    the method further comprising:
    receiving additional information including at least one of:
    information associated with a utility company,
    information associated with one or more third devices associated with parking, or
    information associated with electrical power available to consumers; and providing, based on the additional information and via the second device, the power to a power network that includes at least one of:
the utility company,
a local business, or
a parking location.

4. The method of claim 1, further comprising:
receiving an alert indicating that a power level of the one or more components is below a predetermined threshold;
causing, based on the alert, the one or more components to stop providing power to the second device; and
processing, via a transaction card and based on the alert, payment at a location associated with the second device.

5. The method of claim 1, further comprising:
determining whether the one or more components can provide the power to the second device at a rate requested by the second device.

6. The method of claim 1, wherein the power information includes information indicating a power level associated with the one or more components,
wherein the profile information includes information indicating a first distance from a location associated with the first device to a destination,
wherein the location information includes information indicating a second distance from the location associated with the first device to a charging station, and
wherein determining the one or more payment options is based on the power level associated with the one or more components, the first distance, and the second distance.

7. The method of claim 1, wherein determining the one or more payment options is based on a threshold power level of the one or more components included in the profile information.

8. The method of claim 1, wherein determining the one or more payment options is based on information, included in the profile information, indicating how often the first device is charged.

9. A first device, comprising:
one or more memories; and
one or more processors, coupled to the one or more memories, configured to:
establish communication with a second device associated with parking services;
determine one or more payment options based on receiving information including at least one of:
power information,
profile information, or
location information;
determine, by the first device, that an option to pay for services provided by the second device by providing power to the second device is less expensive than payment by money,
wherein the services provided by the second device are associated with the parking services, and
wherein the option is of the one or more payment options;
recommend, based on determining that the option to pay for services provided by the second device by providing power to the second device is less expensive than payment by money, the option;
display information indicating that the first device recommends the option;
cause, based on displaying the information and based on a particular payment option of the one or more payment options being selected, a power connection to be established between the first device and the second device; and
cause, based on the particular payment option being selected, and based on the power connection, one or more components associated with the first device to provide power to the second device.

10. The first device of claim 9, wherein the second device is associated with a power network that includes at least one of:
a utility company,
a local business, or
a parking location.

11. The first device of claim 9, wherein the first device is integrated within a vehicle; and
wherein the one or more processors are further configured to:
receive additional information including at least one of:
information associated with a utility company,
information associated with one or more third devices associated with parking, or
information associated with electrical power available to consumers; and
provide, based on the additional information and via the second device, the power to a power network that includes at least one of:
the utility company,
a local business, or
a parking location.

12. The first device of claim 9, wherein the one or more processors are further configured to:
receive an alert indicating that a power level of the one or more components is below a predetermined threshold;
cause, based on the alert, the one or more components to stop providing power to the second device; and
process, via a transaction card and based on the alert, payment at a location associated with the second device.

13. The first device of claim 9, wherein the one or more processors are further configured to:
determine whether the one or more components can provide the power to the second device at a rate requested by the second device.

14. The first device of claim 9, wherein the power information includes information indicating a power level associated with the one or more components,
wherein the profile information includes information indicating a first distance from a location associated with the first device to a destination,
wherein the location information includes information indicating a second distance from the location associated with the first device to a charging station, and
wherein determining the one or more payment options is based on the power level associated with the one or more components, the first distance, and the second distance.

15. The first device of claim 9, wherein determining the one or more payment options is based on a threshold power level of the one or more components included in the profile information.

16. The first device of claim 9, wherein determining the one or more payment options is based on information, included in the profile information, indicating how often the first device is charged.

17. A non-transitory computer-readable medium storing a set of instructions, the set of instructions comprising:

one or more instructions that, when executed by one or more processors of a first device, cause the first device to:
establish communication with a second device associated with parking services;
determine one or more payment options based on receiving information including at least one of:
power information,
profile information, or
location information;
determine, by the first device, that an option to pay for services provided by the second device by providing power to the second device is less expensive than payment by money,
wherein the services provided by the second device are associated with the parking services, and
wherein the option is of the one or more payment options;
recommend, based on determining that the option to pay for services provided by the second device by providing power to the second device is less expensive than payment by money, the option;
display information indicating that the first device recommends the option;
cause, based on displaying the information and based on a particular payment option of the one or more payment options being selected, a power connection to be established between the first device and the second device; and
cause, based on the particular payment option being selected, and based on the power connection, one or more components associated with the first device to provide power to the second device.

18. The non-transitory computer-readable medium of claim 17, wherein the first device is integrated within a vehicle; and
wherein the one or more instructions further cause the first device to:
receive additional information including at least one of:
information associated with a utility company,
information associated with one or more third devices associated with parking, or
information associated with electrical power available to consumers; and
provide, based on the additional information and via the second device, the power to a power network that includes at least one of:
the utility company,
a local business, or
a parking location.

19. The non-transitory computer-readable medium of claim 17, wherein the one or more instructions further cause the first device to:
receive an alert indicating that a power level of the one or more components is below a predetermined threshold;
cause, based on the alert, the one or more components to stop providing power to the second device; and
process, via a transaction card and based on the alert, payment at a location associated with the second device.

20. The non-transitory computer-readable medium of claim 17, wherein the one or more instructions further cause the first device to:
determine whether the one or more components can provide the power to the second device at a rate requested by the second device.

* * * * *